US012570558B2

(12) United States Patent
Pettigrew et al.

(10) Patent No.: US 12,570,558 B2
(45) Date of Patent: Mar. 10, 2026

(54) BIOFILTER BLOCK AND USE THEREOF FOR WASTEWATER TREATMENT

(71) Applicant: PREMIER TECH EAU ET ENVIRONNEMENT LTÉE, Rivière-du-Loup (CA)

(72) Inventors: Denis Pettigrew, Notre-Dame-du-Portage (CA); Roger Lacasse, Austin (CA); Yan Gilbert, Rivière-du-Loup (CA)

(73) Assignee: PREMIER TECH EAU ET ENVIRONNEMENT LTÉE, Rivière-du-Loup (CA)

( * ) Notice: Subject to any disclaimer, the term of this patent is extended or adjusted under 35 U.S.C. 154(b) by 0 days.

(21) Appl. No.: 19/120,312

(22) PCT Filed: Oct. 6, 2023

(86) PCT No.: PCT/CA2023/051325
§ 371 (c)(1),
(2) Date: Apr. 11, 2025

(87) PCT Pub. No.: WO2024/077375
PCT Pub. Date: Apr. 18, 2024

(65) Prior Publication Data
US 2025/0263320 A1 Aug. 21, 2025

Related U.S. Application Data

(60) Provisional application No. 63/415,911, filed on Oct. 13, 2022.

(51) Int. Cl.
*C02F 3/32* (2023.01)
*B01D 39/16* (2006.01)
(Continued)

(52) U.S. Cl.
CPC .......... *C02F 3/327* (2013.01); *B01D 39/1615* (2013.01); *B01D 2239/1208* (2013.01);
(Continued)

(58) Field of Classification Search
CPC .... C02F 3/327; C02F 3/04; C02F 3/06; C02F 3/105; C02F 3/109; C02F 2301/028;
(Continued)

(56) References Cited

U.S. PATENT DOCUMENTS 3,700,590 A * 10/1972 Burton ...................... C02F 3/06
210/615
7,097,768 B2 * 8/2006 Talbot .................... B01D 39/04
210/150
(Continued)

FOREIGN PATENT DOCUMENTS

EP 3753398 A1 * 12/2020 ............. F24F 8/175
EP 4036307 A1 8/2022
(Continued)

OTHER PUBLICATIONS

Machine-generated English translation of RU 2026828, generated on Jun. 17, 2025.*
(Continued)

*Primary Examiner* — Fred Prince
(74) *Attorney, Agent, or Firm* — SMART & BIGGAR LP

(57) ABSTRACT

The present application relates to biofiltration materials for filtering a fluid. More specifically, the present application relates to a biofilter material comprising consolidated
(Continued)

organic material, and use of such biofilter material for wastewater treatment. Provided is a biofilter bloc for wastewater treatment comprising a porous consolidated assembly of at least 20% w/w of organic materials, and wherein the consolidated assembly shows a density of about 35 kg/m$^3$ to about 275 kg/m$^3$.

19 Claims, 7 Drawing Sheets

(51) Int. Cl.
*C02F 3/04* (2023.01)
*C02F 3/06* (2023.01)
*C02F 3/10* (2023.01)

(52) U.S. Cl.
CPC .................. *C02F 3/04* (2013.01); *C02F 3/06* (2013.01); *C02F 3/105* (2013.01); *C02F 3/109* (2013.01); *C02F 2301/028* (2013.01); *C02F 2303/20* (2013.01); *Y02W 10/10* (2015.05)

(58) Field of Classification Search
CPC ............ C02F 2303/20; B01D 39/1615; B01D 2239/1208; Y02W 10/10
USPC ................................. 210/510, 615, 150, 151
See application file for complete search history.

(56) References Cited

U.S. PATENT DOCUMENTS

| | | | | |
|---|---|---|---|---|
| 2010/0200480 A1 * | 8/2010 | Kania | ..................... | C02F 3/101 |
| | | | | 210/170.03 |
| 2013/0306554 A1 * | 11/2013 | Kerkhofs | ................ | C02F 3/105 |
| | | | | 210/615 |
| 2017/0217787 A1 | 8/2017 | Presby | | |

FOREIGN PATENT DOCUMENTS

| | | | | | | |
|---|---|---|---|---|---|---|
| JP | 2007098195 | A | * | 4/2007 | | |
| JP | 2009285640 | A | * | 12/2009 | | |
| KR | 20190017090 | A | * | 2/2019 | ............. | C02F 3/109 |
| RU | 2026828 | C1 | * | 1/1995 | | |
| WO | 2005113106 | A1 | | 12/2005 | | |
| WO | 2022203956 | A1 | | 9/2022 | | |

OTHER PUBLICATIONS

Machine-generated English translation of JP 2007098195, generated on Jun. 17, 2025.*
Machine-generated English translation of KR 20190017090, generated on Jun. 17, 2025.*
Machine-generated English translation of JP 2009285640, generated on Jun. 17, 2025.*
Machine-generated English translation of EP 3753398, generated on Jan. 12, 2026.*

* cited by examiner

BIOFILTER BLOCK AND USE THEREOF FOR WASTEWATER TREATMENT

CROSS REFERENCE TO RELATED APPLICATIONS

The present application is a 35 USC 371 national stage entry of PCT/CA2023/051325 filed on Oct. 6, 2023, and which claims the benefit of priority of co-pending U.S. Provisional Patent Application No. 63/415,911, which was filed Oct. 13, 2022. These documents are hereby incorporated by reference in their entirety.

FIELD

The present application is in the field of biofiltration materials for filtering a fluid. More specifically, the present application relates to a biofilter material comprising consolidated fibers, and use of such biofilter material for wastewater treatment.

BACKGROUND

The use of filters or biofilters is well known in the wastewater treatment field. One of the most widespread means for treating domestic wastewater consists of using a filtration bed of a given height made of bulk material and fed by a water distribution system. For decentralized wastewater treatment, where water is treated on-site, the filtering bulk material may be composed of the native soil itself or of imported material, such as sand, or of one or more specific materials such as zeolite, coconut husk fragments (Premier Tech patents U.S. Pat. No. 5,206,206 and EP2322487A1), Xylit®, volcanic rocks or rockwool, to name a few.

Sand- and native soil-based systems relate to approaches that are qualified as "conventional" or "traditional", because of their historical use. These conventional treatment systems usually work under a progressive failure regime, inherent to their distribution system design, being fed by gravity and composed of laterally perforated pipes. Because gravity usually cannot provide enough velocity for water to distribute evenly and quickly through the distribution lines, water usually flows out from the first drain and/or lateral holes encountered, ending with a higher load applied on a fraction of the available area. When the filtering material gets clogged, the water just flows farther in the distribution pipes to reach areas where it can percolate through an underused area of the filter bed, and so on. This water treatment approach requires large land area to ensure an acceptable treatment performance and lifespan of the septic system. For a better use of the surface and to ensure the expected lifespan of sand- or soil-based systems, some jurisdictions impose using low pressure distribution systems, allowing for a significantly improved distribution. One significant drawback of conventional wastewater treatment systems is that they are completely buried underground and inaccessible, rendering difficult, if not impossible, their investigation, repair, and maintenance.

Other materials are used in proprietary treatment systems that typically offer much more compact designs. These usually provide solutions for difficult sites where space for septic system installation might be limited, or groundwater too shallow to allow conventional systems to be installed. The intrinsic characteristics (granulometry, porosity, bulk homogeneity, and density, etc.) of these materials can be better controlled than sand or native soil, combined to an improved water distribution systems as compared to conventional ones, allowing for height and surface reduction of the filtration bed (for example Ecoflo®, X-Perco®, Zeolite-parco, Boxeparco, Tricel Seta, Bionut®, etc.). These water treatment systems are usually small and light enough to be packaged into a reservoir, facilitating handling and installation. Reservoirs typically have cover and accesses making possible investigation, maintenance, and repair.

Between these large conventional systems and proprietary compact biofiltration technologies, there is an approach that combines attributes from both conventional and compact biofiltration systems, being composed of small treatment units, disposed on top of a sand bed, and providing a roughing treatment to the water before it gets into the sand. In addition to performing roughing water treatment, these units usually provide space for retained particles and sludge produced by the biological activity to accumulate, contributing to protect the sand layer, stabilize its treatment efficiency and improve its lifespan. These attributes allow for a smaller and thinner sand layer than conventional systems, with similar treatment performances and lifespan. These treatment units are usually composed, for example, of an assemblage of infiltrative/ventilation channels and filtering foam (Epanbloc®) or geotextiles (Septodiffuseur; Eljen GSF®; U.S. Pat. Nos. 6,048,131; 6,461,078), or of corrugated apertured-conduits over which is laid single layers of fabric (Enviro Septic®; U.S. Pat. No. 5,954,451). Textiles and fabrics allow for particles filtration and retention within the treatment unit, whereas channels are typically layered with sheets of a corrugated material providing surface for microbial growth and space for sludge and water accumulation. These treatment units are entirely composed of synthetic materials which fabrication are known for their significant environmental footprint. The fact that the materials can hardly be valorized through composting, recycling or reused at the end of their valuable life contributes to that environmental footprint. Moreover, the geotextiles or layers of fabric used for particles retention in these products are typically made of low hydraulic conductivity materials, such as non-woven textiles, leading to relatively quick clogging caused by solids and biological sludge accumulation, negatively impacting the product's lifespan. Every product and technology described relating to this water treatment approach is designed to be completely buried, rendering their investigation, maintenance, and repair particularly difficult, if not impossible, without complete excavation of the system. In addition to the fact that excavating the system significantly damages the landscape, it may be very expensive and time consuming.

During the biofiltration of wastewater, two processes happen simultaneously within the filtration material: the retention of particles and the biological transformation of pollutants. The efficiency of particles retention in a given application will depend on the particle-to-be-removed's nature, size, density and velocity within the filtration material, and on the filtering material's nature and porometry. Porometry refers to the pore sizes distribution and their network connectivity. For a bulk material, that porometry will mainly be dependent on the pores within the pieces of the material, the size distribution of these pieces and bulk density. The pieces size distribution and bulk density will be responsible for the pore sizes distribution around the material pieces. Porometry is of high significance for water biofiltration, since it has a great impact on many key parameters that allow reaching a given treatment efficiency and reliability, and system longevity: oxygen transfer to the liquid phase, water and air flow velocity and dispersion within the filtering material, water retention, and sludge accumulation capacity. More of smaller pores will promote water retention within the filtration bed, as well as an increase of protected area for bacteria to thrive and more tortuous path for water and air to flow, increasing retention time within the system and thus contributing to higher probabilities for pollutants to be removed. Larger pores will contribute to higher oxygen transfer efficiency and sludge accumulation capacity, but too many large pores could contribute to an insufficient flow restriction, leading to shorter retention times and lower pollutant removal efficiencies. The porometry of a material will also impact its resistance to the water flow (hydraulic conductivity), strictly controlling the hydraulic loading that can be applied on a given surface area of that material and thus the biofilter process sizing. A delicate equilibrium must thus be reached under which both targeted treatment performances and expected system longevity are answered.

Native soils are typically of high heterogeneity in terms of composition and granulometry, whereas sand also shows significant variations of sizes and composition, being harvested from alluvial or mining sources. Because of this, added to the fact that soil particles and sand grains do not encompass any inner porosity, these materials offer limited porometry control, if any. The transformation or fabrication of filtering materials offers, to a certain extent, the possibility to the manufacturer to control their physical characteristics in terms of size and internal porosity. Some porous mineral-based materials used for biofiltration, such as zeolite, are residues from the construction industry which itself harvests it from dedicated quarries. Due to the mechanical properties of these rocks, that do not allow bulk material to be densified, and their intrinsic inner porosity that is inherent to the geology of origin, the porometry is also difficult to control other than modifying particles distribution size. Other mineral-based materials, such as expanded clay, that can be expanded or foamed, offer more flexibility over porometry, because their manufacturing processes may be adapted and controlled, to a certain extent, to obtain the targeted inner porosity. However, these materials still come from mining ores that inherently constitute limited resources, and are known to have strong environmental footprint.

Many organic materials have been described for wastewater biofiltration, such as rice husk (Renang et al., 2018), rice or wheat straws, hemp fibers (Premier Tech PCT/FR2016/000120), coconuts husk (Premier Tech patents U.S. Pat. No. 5,206,206 and EP2322487), bark (Premier Tech PCT/FR2014/050629; Lens et al., 1994), wood fibers or chips (Lens et al., 1994), xylit (Eloy Water; Spychala et al. 2021), hazelnut (Simop) or peanut shells, to name a few (Loh et al, 2021). Originating from plants, they contribute to carbon fixation and low environmental footprints. However, they have lower resiliency than mineral materials and reduced stability over time. Organic materials all have a fixed specific intrinsic inner porosity that can hardly be altered, whereas porosity of the bulk material can be controlled through particles size distribution and bulk density. The mechanical properties of such bulk materials allow them to be densified to a certain extent, adding to granulometry for porometry control. Bulk densification occurs mainly during product assemblage, within a containment, and during product transportation. The absence of containment renders bulk material densification difficult, if not impossible, due to material spreading. When bulk material is placed in a container, particular care must be taken to ensure homogenous bulk densification of the filtering material in wastewater treatment products to limit uneven water movements within the filtering bed through less compressed zones, and thus a non-optimal use of the filtering material. That requires filtering material setting methods to be developed and rigorously followed during product assembly, thus requiring additional effort manufacturing such products.

Synthetic materials offer more possibilities in terms of porometry control since they can be produced in different forms through many manufacturing processes, such as bulk material, sheets, extrusions, or blocs, given different geometries, and foamed to get an inner porosity, if required. Polyethylene, polypropylene, polystyrene, and polyurethane are a few examples of materials that may be used for such application. They can easily be molded or cut into various forms that are light and easy to handle, making them good candidates for biofiltration applications. However, all these are petroleum-based materials that also exhibit a strong environmental footprint added to the fact that they are complicated to valorize at their end of life given their contamination with biosolids. Products have been proposed that combine organic and synthetic materials to reduce the environmental impacts of synthetics, to benefit from both attributes, and overcome their inherent limitations, for example a combination of peat and porous synthetic materials in a vertical configuration (Premier Tech PCT/CA01/01022). While being very efficient for treating high hydraulic loads, that approach has shown to be very expensive to manufacture, added to the fact that the used and contaminated material is complicated to handle and can hardly be valorized. 100% textile-based biofilters (Advantex™) or polyurethane foam (Aerocell™) filters encounter the same restrictions in terms of costs and regeneration problems.

The lifespan of biofiltration systems is mainly based on the filtering bed porosity evolution, itself being strongly dependant on sludge accumulation, and porosity loss due to material compaction. Bulk organic materials and many porous synthetic materials show various resistances to compaction with time, but nonetheless will lose porosity through that phenomenon. That compaction may contribute to a substantial percentage of porosity loss for less resistant materials. Peat-based biofilters, such as the Ecoflo® biofilter, will lose up to 50% of its porosity through compaction over their lifespan whereas other more resistant materials, such as coco husk fragments, may see 20 to 40% of porosity loss by compaction at end of life. This is mainly due to material collapsing on its own weight because of sludge and water accumulation, but also to material degradation. This phenomenon is also noticeable for synthetic polyurethane cubic foam-based biofiltration systems, even though that material does not degrade. The collapse of bulk materials is due in part to being unstructured, each piece of the materials acting individually, with nothing more than neighbor pieces to impair its movement through the bed and its own collapse. Denser bulk materials will see that impairment for pieces movement increase.

Porous organic materials offer many benefits for biofiltration processes:

Composed of renewable materials that can be treated through biosolids management processes at their end of life, thus having low environmental footprint;

Intrinsically possess inner pores that contribute to filter bed microporosity, responsible for water retention and for the biofilter's robustness against harsh conditions for the microorganisms thriving within the material (toxics, hydraulic peaks, pH conditions, zero flow period, etc.);

Porometry can be controlled through different pathways: pieces geometry and size distribution and density of the material (structured and unstructured).

However, biodegradability is their main drawback, leading to an evolving material that may lose its biofiltration properties through time. It is thus mandatory to choose a material that will keep its properties long enough so that the biofilter performance remains over the expected lifespan. In decentralized wastewater treatment industry, it is typically required that such material lasts at least 10 years, but shorter lifespans could be proposed under other business models for which the filtering material is replaced more often.

The stability of organic material to biodegradation is strongly related to its lignin content (Loh et al. 2021); organic materials can be stabilized through heating processes that remove or transform labile and more biodegradable molecules (torrefaction, pyrolysis) into more stable ones. A few indicators have been developed to assess that stability and to benchmark organic materials used for different purposes, such as agriculture and horticulture, the AFNOR standard FD U44-162 being one, applying the EOC method (EOC-exogenous organic carbon). This index relates the stability of an organic material to its chemical content (fractions of the soluble components, hemicellulose, cellulose, and lignin) and the mineralized carbon after 3 days of incubation according to AFNOR XP U 44-163 standard method. The higher the value, the more stable is a material to biodegradation (Lashermes et al. 2009). Agronomists use such index to estimate the fraction of an organic material that will remain as stable humus after its introduction to soils. Conditions encountered within a filtering media used for water treatment are usually harsher than those found in soils because of the tremendous amount of highly active microorganisms thriving there, added to the sustained high humidity level within the filtration bed throughout the life of the material. This emphasizes the need for materials able to maintain their integrity, or at least not losing it too rapidly, so that their porosity remains sufficient and adequate for water treatment over the expected lifespan.

As such, there is need to provide improved filtering material which porosity is better controlled, through its manufacturing process, and density homogeneity can be more easily ensured for optimal water and air flows within the filtration bed. That material should be organic based to minimize its environmental footprint and facilitate its valorization at end of life. It should also be structured and consolidated to maximise its resistance to compaction, for a more reliable treatment and longer lifespan.

SUMMARY

It has been shown herein that a biofilter bloc of the present application provides for a consolidated assembly which is more resistant and has a controlled porometry. The bloc of the present application further provides for easy handling and installation, and lower carbon footprint. Structuring and consolidating material through processes that link pieces altogether, using binding agents, vulcanization of sprayed rubber, or mechanical processes (needled punching, pressure molding), allow for a cohesion between the material pieces and such, better resistance to compaction. That cohesion, leading to rigid blocs instead of loose pieces, may also allow for easier handling of the filtering material during systems assembly or installation.

Accordingly, the present application includes a biofilter bloc for wastewater treatment comprising a porous, consolidated assembly of at least 20% w/w of organic material, and wherein the consolidated assembly has a density of about 35 $kg/m^3$ to about 275 $kg/m^3$.

Also included is a biofilter system comprising a plurality of biofilter blocs of the present application.

The present application further includes a biofilter system for wastewater treatment, comprising: a plurality of biofilter blocs, each biofilter bloc comprising a porous consolidated assembly of at least 20% w/w of organic material, and wherein the consolidated assembly has a density of about 35 $kg/m^3$ to about 275 $kg/m^3$, wherein the plurality of biofilter blocs are disposed according to an organized pattern, and a protective shell.

The present application also provides a kit for the treatment of wastewater comprising: at least one biofilter bloc; at least one protective shell; and instructions of installation.

Also included is use of a biofilter bloc, a biofilter system or a kit of the present application for wastewater treatment.

Further provided is a method for producing a biofilter bloc of the present application, the method comprising forming sheets of organic material with a binder, disposing a plurality of sheets in a mold and compressing to provide a consolidated assembly having a density of about 35 $kg/m^3$ to about 275 $kg/m^3$.

Also included is a method for treating wastewater, the method comprising: disposing a biofilter bloc or a biofilter system of the present application in a wastewater environment, receiving the wastewater on the biofilter bloc or the biofilter system to separate contaminants from the wastewater, optionally recovering treated water.

Further included is a method for installing at least one biofilter bloc in a wastewater environment, the method comprising: disposing at least one biofilter bloc of the present application in the wastewater environment, for receiving the wastewater.

Also included is a method for installing at least one biofilter bloc in a drain field to optimize filtration, the method comprising: disposing the at least one biofilter bloc of the present application on a filtration media of the drain field, for receiving the wastewater.

Also provided is a method of preparing a drain field, the method comprising: disposing at least one biofilter bloc of the present application on a filtration media of the drain field, for receiving wastewater.

Further provided is a method of modifying/optimizing a drain field, the method comprising: disposing at least one biofilter bloc of the present application on a filtration media of the drain field, for receiving wastewater.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF DRAWINGS

The embodiments of the application will now be described in greater detail with reference to the attached drawings in which.

7 8

FIG. 2A and FIG. 2B show perspective views of irregular geometries of a biofilter bloc according to exemplary embodiments of the application.

FIG. 3A, FIG. 3B, FIG. 3C, FIG. 3D, FIG. 3E and FIG. 3F show perspective views of organized patterns of a biofilter system according to exemplary embodiments of the application.

FIG. 4A, FIG. 4B, FIG. 4C and FIG. 4D are a perspective view, a top view, a side view and a front view, respectively, of a biofilter bloc within a protective shell according to exemplary embodiments of the application.

Figure 5:
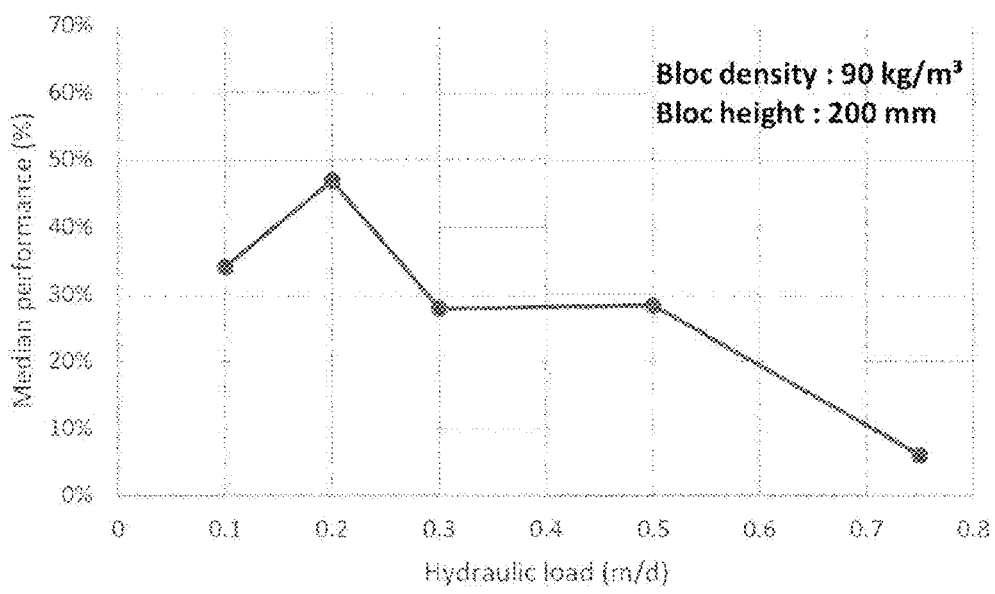

FIG. 5 a graph of median $BOD_5$ removal performance as a function of hydraulic load, according to exemplary embodiments of the application.

Figure 6:
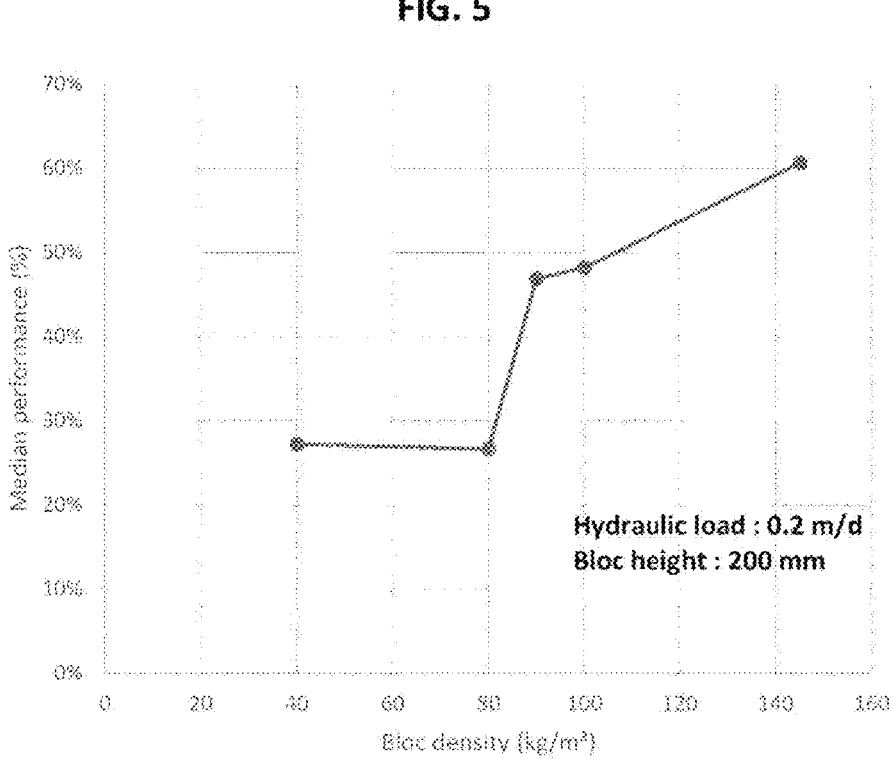

FIG. 6 shows a graph of median $BOD_5$ removal performance as a function of bloc density, according to exemplary embodiments of the application.

Figure 7:
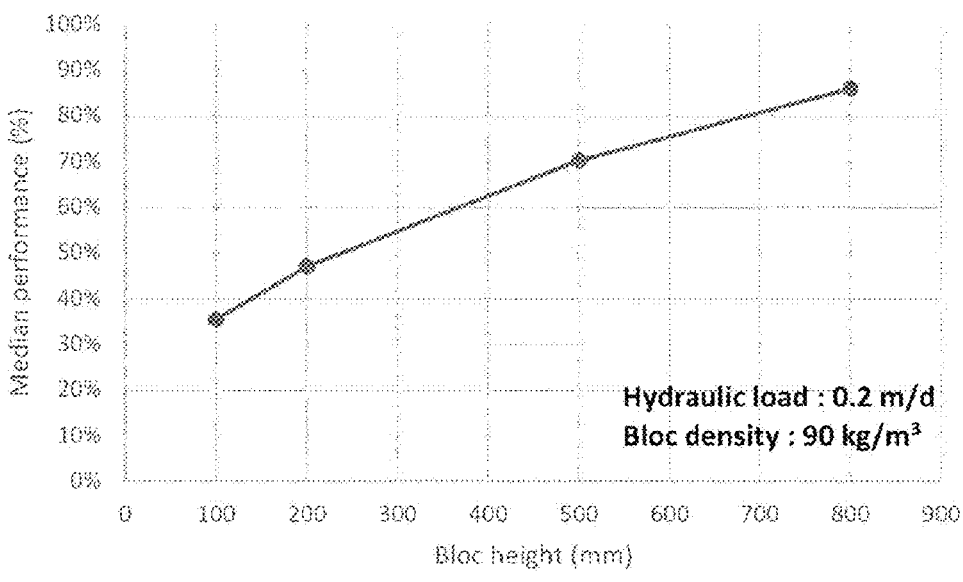

FIG. 7 shows a graph of median $BOD_5$ removal performance as a function of bloc height, according to exemplary embodiments of the application.

Figure 8:
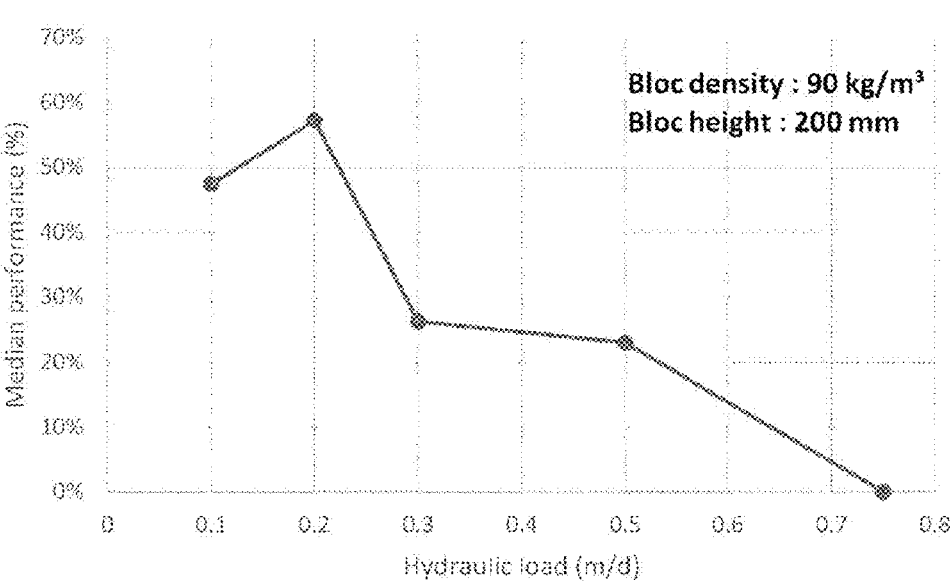

FIG. 8 shows a graph of median TSS removal performance as a function of hydraulic load, according to exemplary embodiments of the application.

Figure 9:
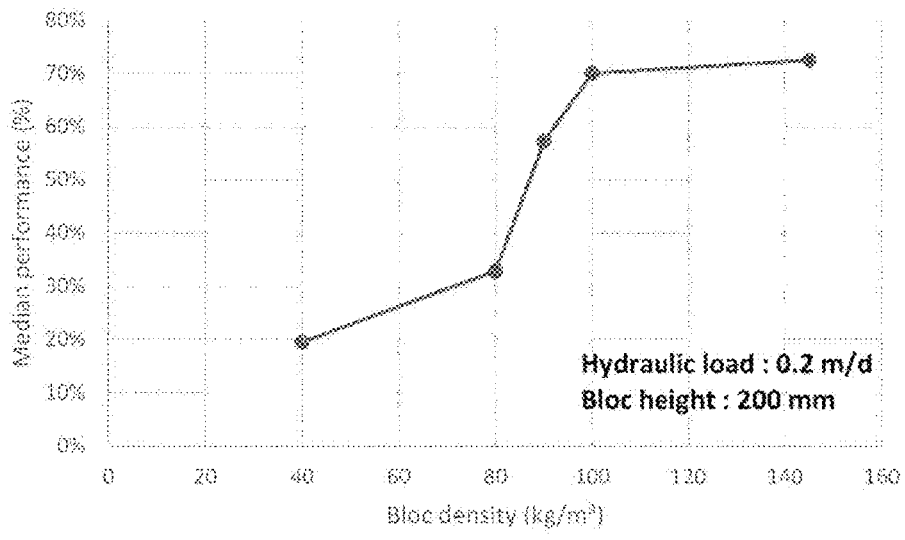

FIG. 9 shows a graph of median TSS removal performance as a function of bloc density, according to exemplary embodiments of the application.

Figure 10:
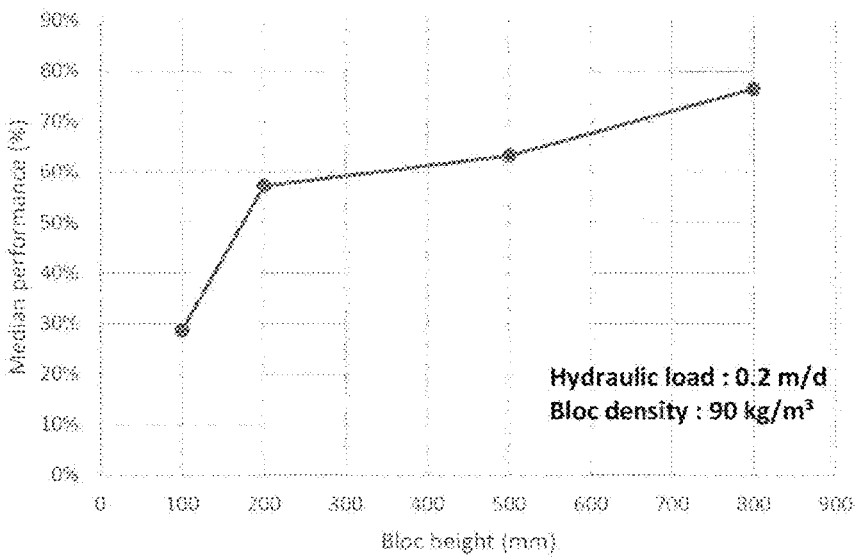

FIG. 10 shows a graph of median TSS removal performance as a function of bloc height, according to exemplary embodiments of the application.

DETAILED DESCRIPTION

I. Definitions

Unless otherwise indicated, the definitions and embodiments described in this and other sections are intended to be applicable to all embodiments and aspects of the present application herein described for which they are suitable as would be understood by a person skilled in the art.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

As used in the present application, the singular forms "a", "an" and "the" include plural references unless the content clearly dictates otherwise. For example, an embodiment including "a component" should be understood to present certain aspects with one component, or two or more additional components.

In embodiments comprising an "additional" or "second" component, the second component as used herein is different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

The term "composition of the application" or "composition of the present application" and the like as used herein refers to a composition comprising one or more material or component of the application.

The term "suitable" as used herein means that the selection of the particular composition or conditions would depend on the specific steps to be performed, the identity of the components to be transformed and/or the specific use for the compositions, but the selection would be well within the skill of a person trained in the art.

The present description refers to a number of chemical terms and abbreviations used by those skilled in the art. Nevertheless, definitions of selected terms are provided for clarity and consistency.

The term "porous" as used herein refers to a material comprising pores or voids dispersed therein.

The term "consolidated assembly" as used herein refers to elements assembled into a unified whole in a cohesive manner, i.e. assembled elements that require a reasonable force to un-assemble the elements.

The terms "an index of exogenous organic carbon" or "EOC" as used herein refer to an indicator of biodegradability of an organic material.

The term "wastewater" as used herein generally refers to domestic wastewaters, including greywaters, partially treated wastewater and treated wastewater.

II. Materials and Compositions of the Application

It has been advantageously shown herein that a biofilter bloc of the present application provides for a consolidated assembly which is more resistant and has a controlled porometry. The blocs of the present application further provide for easy handling and installation. Comparable filtering media did not display the same properties, highlighting the results obtained with the biofilter blocs of the application.

Accordingly, the present application includes a biofilter bloc for wastewater treatment comprising a porous consolidated assembly of at least 20% w/w of organic materials.

In some embodiments, the consolidated assembly has a density of about 35 $kg/m^3$ to about 275 $kg/m^3$. In some embodiments, the density is about 60 $kg/m^3$ to about 200 $kg/m^3$. In some embodiments, the density is about 75 $kg/m^3$ to about 150 $kg/m^3$.

In some embodiments, the consolidated assembly has a total porosity of about 70% to about 97% v/v. In some embodiments, the total porosity is about 80% to about 95% v/v. In some embodiments, the total porosity is about 85% to about 90% v/v, about 90% to about 96% v/v or about 92% to about 96% v/v.

In some embodiments, the consolidated assembly has a surface area of about 0.25 m² to about 8 m². In some embodiments, the surface area is about 0.5 m² to about 6 m². In some embodiments, the surface area is about 1 m² to about 5 m². It may be desirable to provide blocs with smaller or larger surface areas, based on the intended uses. As such, it will be understood by a skilled person in the art that the surface area of the bloc is not hereby to be limited. However, one will appreciate that for a surface area too small, it may be difficult to obtain the consolidated assembly of the desired density, and larger surface areas may be difficult to handle. It would be within the purview of a skilled person in the art to select appropriate surface areas for a specific application, while maintaining the desired properties of the consolidated assembly. The biofilter bloc may also take various shapes, such as those shown in FIG. 1A, FIG. 1B, FIG. 1C and FIG. 1D, for example. The present application is not intended to be limited to a specific shape or dimension of the bloc.

In some embodiments, the organic materials have an index of exogenous organic carbon (EOC) above about 36. In some embodiments, the organic materials have an index of exogenous organic carbon (EOC) of about 36 to about 95. In some embodiments, the organic materials have an index of exogenous organic carbon (EOC) of about 40 to about 85. In some embodiments, the organic materials have an index of exogenous organic carbon (EOC) of about 50 to about 75. In some embodiments, the organic materials have an index of exogenous organic carbon (EOC) of about 60 to about 85. A skilled person in the art will appreciate that any organic material having this EOC may be selected or organic material may be modified to provide for a desired EOC, according to known methods in the art and this would be well within the purview of the skilled person.

In some embodiments, the consolidated assembly comprises about 25% to about 100% of organic material. In some embodiments, the consolidated assembly comprises about 30% to about 90% of organic material. In some embodiments, the consolidated assembly comprises about 40% to about 80% of organic material. A skilled person in the art would appreciate that using organic material will lower the carbon footprint of the consolidated assembly by avoiding or reducing the use of higher carbon footprint material, such as plastics. As such, a higher proportion of organic material will provide a lower carbon footprint, and selecting a suitable proportion while maintaining the desired properties of the biofilter bloc would be within the purview of a skilled person.

In some embodiments, the organic material is a plant-origin material. In some embodiments, the organic material is selected from coconut fibers, hemp fibers, woodchips, wood fibers, flax fibers, rice residue, straw, peat, and mixtures thereof. In some embodiments, the organic material is stabilized by heat to provide an EOC above about 36. In some embodiments, the organic material is stabilized by torrefaction or pyrolysis. In some embodiments, the organic material comprises elongated material. In some embodiments, the organic material has an elongation ratio of width:length of about 1:3000 to about 1:300, or about 1:2500 to about 1:500, or about 1:2000 to about 1:750. In some embodiments, the organic material comprises elongated fibers.

In some embodiments, the biofilter bloc further comprises a binder. For example, the binder may assist in forming the consolidated assembly of a desired density and porosity. It would be well within the purview of a skilled person in the art to select an appropriate binder for achieving the desired properties, according to the specific intended uses of the bloc. In some embodiments, the binder is selected from latex, polylactic acid, polyester, polyurethane, and mixtures thereof. In some embodiments, the binder is latex.

In some embodiments, the consolidated assembly of said organic materials is by a mechanical method, a chemical method, or a combination thereof. In some embodiments, the mechanical method is selected from pressing, molding, heating, needled punching, and combinations thereof. In some embodiments, the chemical method is selected from vulcanization, polymerization and combinations thereof.

In some embodiments, the biofilter bloc has a regular geometry or an irregular geometry on at least one face. In some embodiments, the irregular geometry is such that the biofilter bloc is to be used according to a given orientation, with a top and a bottom, and left, right, anterior, and posterior sides. In some embodiments, the irregular geometry is on the top face and defines at least one concave portion. In some embodiments, the irregular geometry is on the top face and defines at least one v-shape surface, u-shape surface, w-shape surface, dimpled surface, embossed surface, or combinations thereof. In some embodiments, the biofilter bloc comprises at least one localized densification of the consolidated assembly. Without being bound to theory, the irregular geometry will restrict the wastewater from flowing towards the sides of the biofilter bloc and thus ensure filtration through the bloc. It would be within the purview of a skilled person in the art to select an appropriate configuration to achieve the same. For example, a v-shape top surface is illustrated in FIG. 2A. FIG. 2B also shows a v-shape top surface, and additionally complementary L-shape extremities such that one extremity of a bloc would conform to the complementary L-shape extremity of a second bloc. As such, it can be seen that irregular geometries may also serve to assist in stabilizing/supporting/securing together a plurality of blocs.

Figures 1A, 1B, 1C, 1D:
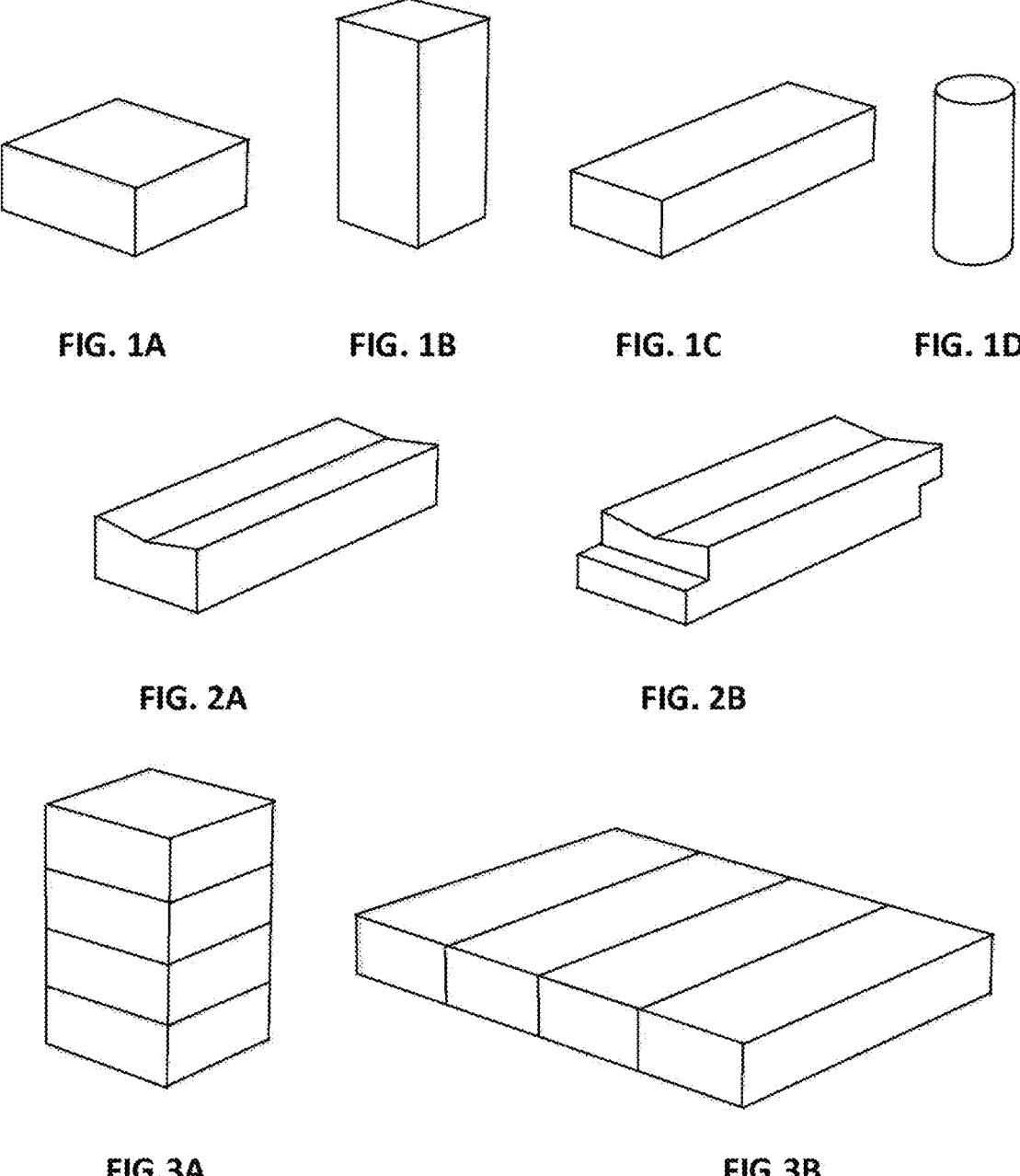
FIG. 1A, FIG. 1B, FIG. 1C and FIG. 1D show perspective views of various shapes of a biofilter bloc according to exemplary embodiments of the application.
Figure 3C:
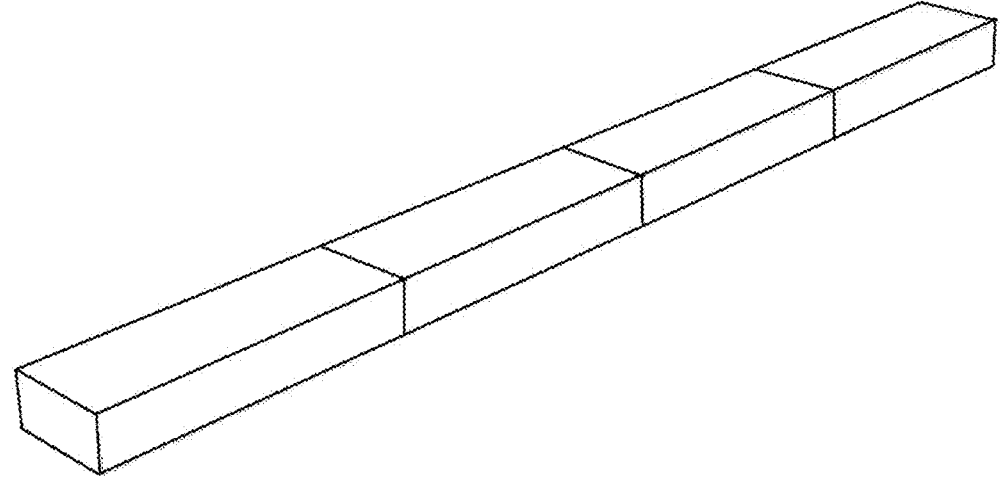
Figure 3D:
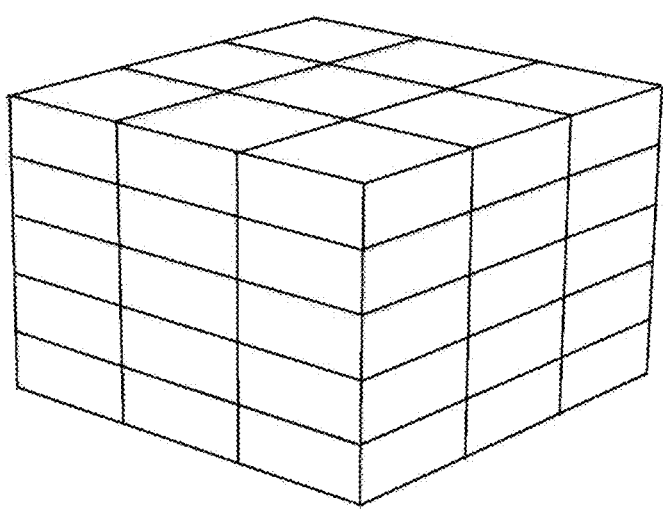
Figure 3E:
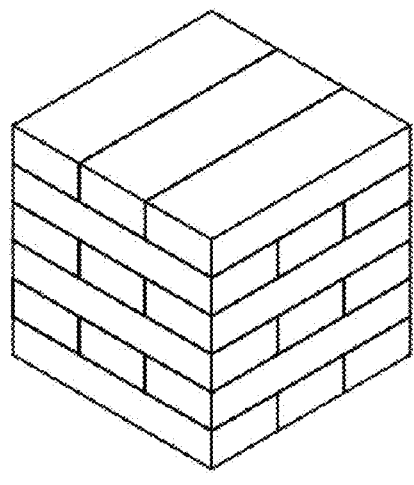
Figure 3F:
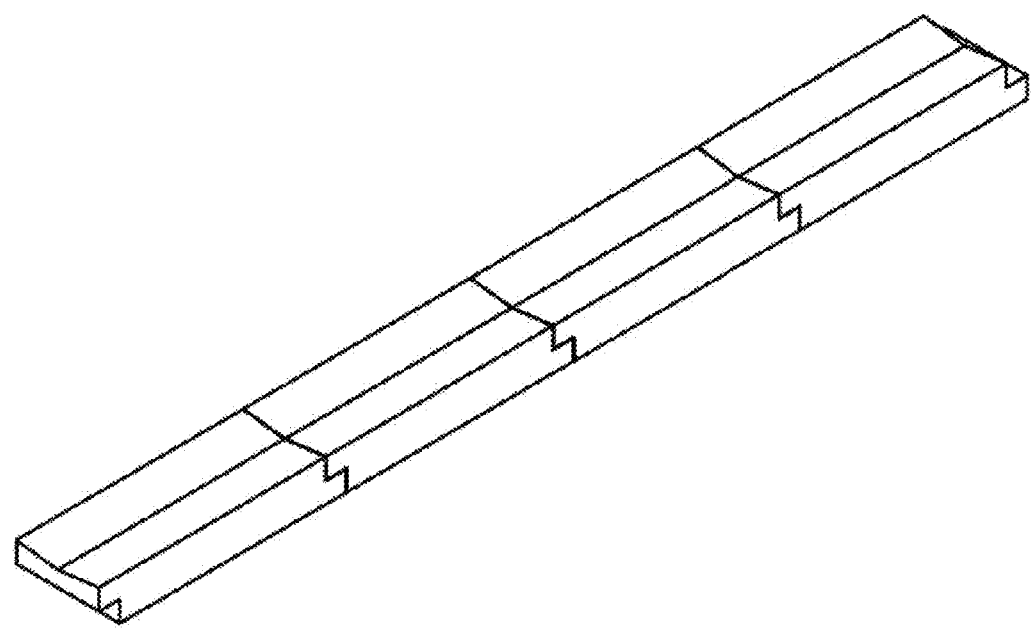
Figure 4A:
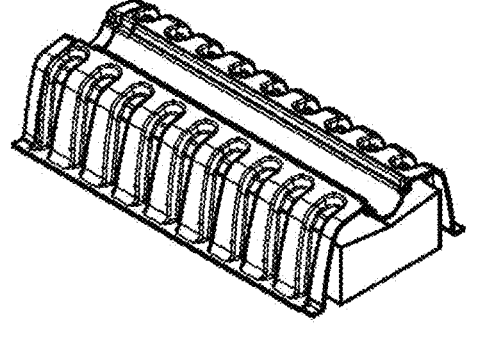
Figure 4B:
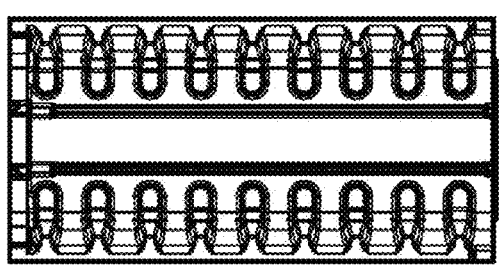
Figure 4C:
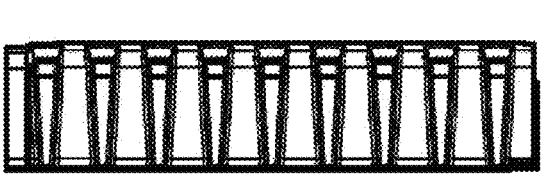
Figure 4D:

In some embodiments, a plurality of biofilter blocs are disposed according to an organized pattern to form biofilter systems. In some embodiments, said organized pattern comprises disposing the plurality of biofilter blocs side by side, consecutively, or superimposing the plurality of biofilter blocs one onto the other, or a combination thereof. Exemplary organized patterns are presented in FIG. 3A, FIG. 3B, FIG. 3C, FIG. 3D, FIG. 3E and FIG. 3F. For example. FIG. 3A shows a superimposed pattern, FIG. 3B shows a side-by-side pattern, FIG. 3C shows a consecutive pattern and FIG. 3D shows a combination of superimposition, consecutive and side by side pattern. FIG. 3E shows an alternate pattern of longitudinal/transversal superimposed blocs, such as a quincunx-type pattern. FIG. 3F shows a consecutive pattern of blocs having irregular geometries such as a v-shape top surface and an L-shape extremity complementary to the adjacent bloc. It would be within the purview of a skilled person in the art to select an appropriate pattern based on intended application and specific environment parameters.

In some embodiments, wherein the biofilter systems have a height of about 100 mm to about 1000 mm. In some embodiments, the biofilter systems have a height of about 200 mm to about 800 mm. In some embodiments, the biofilter systems have a height of about 300 mm to about 700 mm. It will be appreciated that the dimensions of a final biofilter system is tunable by combining a plurality of biofilter blocs as required, selecting different shapes, geometry, etc.

In some embodiments, the biofilter bloc further comprises a protective shell surrounding all faces or leaving one face unprotected. The protective shell is configured to ensure integrity of the bloc, for example by protecting against compression thereof, and also ensure proper aeration of the system, through a circulation space thus created between the shell and the bloc. In some embodiments, the face unprotected is the bottom face. An unprotected face will allow the treated water to flow towards a further treatment zone, such as another biofilter bloc or filtration media. The protective shell may be configured to be complementary one to another to allow stacking of a plurality of shells, or configured to enclose a plurality of blocs within one shell. An exemplary system including a biofilter bloc within a protective shell is shown in FIG. 4A, FIG. 4B, FIG. 4C and FIG. 4D. However, it would be within the purview of a skilled person in the art to design an appropriate protective shell according to intended uses, environment, configuration of the blocs, etc.

The present application also provides a kit for the treatment of wastewater comprising: at least one biofilter bloc; at least one protective shell; and instructions of installation.

Further included is a biofilter system comprising a plurality of biofilter blocs of the present application.

The present application also includes a biofilter system for wastewater treatment, comprising a plurality of biofilter blocs, each biofilter bloc comprising a porous consolidated assembly of at least 20% w/w of organic materials, and wherein the consolidated assembly has a density of about 35 $kg/m^3$ to about 275 $kg/m^3$, wherein the plurality of biofilter blocs are disposed according to an organized pattern, and at least one protective shell.

III. Methods and Uses of the Application

The biofilter blocs of the present application provide for a consolidated assembly which are more resistant and have a controlled porometry. The blocs of the present application further provide for easy handling and installation.

Accordingly, the present application includes use of a biofilter bloc, a kit or a biofilter system of the present application, for wastewater treatment.

The present application further includes use of a biofilter bloc, a kit or a biofilter system of the present application, for wastewater treatment in a drain field.

A method for treating wastewater is also provided, the method comprising: disposing a biofilter bloc or a biofilter system of the present application in a wastewater environment, receiving the wastewater on the biofilter bloc or the biofilter system to separate contaminants from the wastewater, optionally recovering treated water.

In some embodiments, the method is for treating wastewater in a drain field.

The present application further includes a method for installing at least one biofilter bloc in a wastewater environment, the method comprising: disposing the at least one biofilter bloc in the wastewater environment, for receiving the wastewater; wherein the at least one biofilter bloc comprises a porous consolidated assembly and the consolidated assembly has a density of about 35 $kg/m^3$ to about 275 $kg/m^3$.

In some embodiments, the at least one biofilter bloc is disposed on a filtration media. In some embodiments, the filtration media is a sand bed, biochar, recycled glass, native soil, or combination thereof.

Also included is a method for installing at least one biofilter bloc in a drain field to optimize filtration, the method comprising: disposing the at least one biofilter bloc on a filtration media of the drain field, for receiving the wastewater; wherein the at least one biofilter bloc comprises a porous consolidated assembly and the consolidated assembly has a density of about 35 $kg/m^3$ to about 275 $kg/m^3$.

IV. Methods of Preparing the Compounds and Compositions of the Application

The biofilter bloc of the present application may be prepared according to various methods for consolidation of the organic materials into a consolidated assembly.

Accordingly, the present application further includes a method for producing a biofilter bloc comprising forming sheets of organic material with a binder, disposing a plurality of sheets in a mold and compressing to provide a consolidated assembly having a density of about 35 $kg/m^3$ to about 275 $kg/m^3$.

In some embodiments, forming sheets comprises mixing of the organic material with the binder on a moving air-permeable belt, and/or using needle-punching.

EXAMPLES

The following non-limiting examples are illustrative of the present application.

General Methods

Method 1—Molding/Compression

The consolidated assembly of organic material of the present application may be obtained according to the following general procedure:

Organic fibers are air laid onto a moving air-permeable belt and bound using latex;

Superimposed sheets of latex-binded organic fibers are molded and compressed to the targeted density to form a consolidated assembly;

The latex of this latex-binded consolidated assembly is stabilized using heat;

Shapers may be used during stabilization to mold depressions on the assembly surface.

Method 2—Needle Punching

Alternatively, the consolidated assembly of organic material of the present application may be obtained according to the following general procedure.

Organic fibers are air laid onto a moving air-permeable belt and bound using needle-punching and latex. The use of needle-punching allows for less latex for the assembly consolidation;

Superimposed sheets of latex-binded organic fibers are molded and compressed to the targeted density to form a consolidated assembly;

The latex of this latex-binded consolidated assembly is stabilized using heat;

Shapers may be used during stabilization to mold depressions on the assembly surface.

Example 1—Organic Materials

Organic materials have been tested for EOC (Table 1).

TABLE 1

| Stability index of various organic materials | |
| --- | --- |
| Materials | EOC value (Premier Tech internal analysis) |
| Coco | 80 |
| Wood | 60 |
| Hemp | 36 |
| Bark | 82 |
| Bagasse | 55 |
| Peat | 85 |
| Corn fiber | 30 |

Many organic materials have been tested because of their availability, low costs, and intrinsic properties (Ghazy et al., 2016; Loh et al., 2021), but were not monitored long enough to assess their stability over time within a biofiltration process. Coir, peat, and bark show the highest EOC values of Table 1, suggesting a lower biodegradability as compared to other organic materials. These were selected by Premier Tech as filtering material for its products, not only because of their intrinsic properties, their costs, or their availability, but also because they showed good stability over time within domestic wastewater treatment applications. Other materials showing higher biodegradability, such as hemp, have shown their ability for wastewater biofiltration with acceptable lifespan despite their lower stability (Premier Tech PCT/FR2016/000120). An organic-based filtering material showing an EOC value equal or higher than hemp can thus be considered stable enough for its use in such application.

As stated above, porometry is of high significance for water biofiltration, since it has great impact on many key parameters that allow reaching a given treatment efficiency, reliability, and system longevity. For a bulk material, that porometry will mainly be dependent on the pores within the pieces of the material, the size distribution of these pieces and bulk density. The latter is closely related to the filtering materiel pieces size and inherent density, but also to the filtration bed compression level. That will drive, for a given organic material, the size pores distribution around the filtering material pieces and their spatial organization, strongly impacting the retention time of a fluid or a particle within the filtration bed, and thus treatment quality. Densities ranging between 60 to 275 kg/m³ were reported for bulk organic material used for biofiltration (Table 2), but values between 85 and 200 kg/m² are more typical of the industry depending on filtering material pieces intrinsic density. Rock et al. (1984) showed that using peat densified above 150 kg/m³ led to premature clogging of the material, whereas Lens et al. (1994) found similar treatment capacity for peat between 75 and 100 kg/m³, and for bark between 150 and 175 kg/m³. A skilled person in wastewater biofiltration will understand that under a density threshold, the restriction to the flow may be insufficient for retention times fit for wastewater treatment whereas over another higher threshold, materials will be more prone to premature clogging due to too many small pores to accumulate particles and produced sludge over an extended period. Typically, an organic material bulk density used for biofiltration can hardly be under 60 kg/m³ because of a much lower resistance to compaction that leads to shorter lifespan and poor treatment quality, whereas bulk densities above 150 kg/m³ for lighter materials, such as peat, and 275 kg/m³ for denser materials, such as coco husk and bark, may lead to shorter lifespan due to premature clogging. Hence, the optimal density for an organic filtering material to get the right combination of pores sizes, resistance to compaction and flow restriction for biofiltration applications should be within 60 to 275 kg/m³. These densities represent the average bulk density, but it must be reminded that obtaining homogenous densification of a bulk material requires filtering material setting methods to be developed and rigorously followed during product assembly, thus requiring additional optimization for manufacturing such products. Not rigorously following these methods can promote uneven water movements within the filtering bed through less compressed zones, and thus a non-optimal use of the filtering material.

TABLE 2

| Density ranges for organic materials used for wastewater biofiltration | | |
| --- | --- | --- |
| Materials | Dry bulk density for water biofiltration (kg/m³) | References |
| Coco | 75-275 | EP2322487 |
|  | 60-140 | Premier Tech[a] |
| Wood chips | 75-100 | Lens et al., 1994 |
| Hemp | 100-114 | PCT/FR2016/000120 |
| Bark | 150-175 | Lens et al., 1994 |
|  | 200 | Premier Tech[a] |
| Peat | 60-80 | U.S. Pat. No. 5,206,206 |
|  | 90-150 | Rock et al., 1984 |
|  | 75-100 | Lens et al., 1994 |
|  | 130-170 | Kennedy, 1998 |
| Cocoa shell | 105 | Turcotte, 2009 |

[a]Density values within Premier Tech's biofiltration products

For a consolidated filtering bloc, the porosity is related to its density value and will depend on the intrinsic density of the organic material used and its quantity within the bloc. The total porosity of consolidated filtering blocs composed of coco fibers and latex, having densities ranging from 67 to 141 kg/m³, was measured, and varied from 87 to 94% v/v. For this material, it should be expected that the porosity, from the extrapolation of the relationship between density and total porosity, will vary from 70 to 97% v/v within densities ranging from 35 to 275 kg/m³.

Example 2—Biofilter Blocs Performance

Small-scale and full-scale experimental units were fed with primarily treated domestic wastewater, at daily hydraulic loads between 0.10 to 0.75 m/d, under a feeding regimen providing hydraulic peaks between 0.013 to 0.100 m/h. Results are shown in Table 3. Tested filtering blocs were either composed of coco fibers bonded using vulcanized natural latex (80/20% w/w) or hemp fibers bonded using polyester (92/8% w/w), for organic materials' EOC value ranging from 36 to 80. Tested densities varied between 35 to 145 kg/m³, as shown in Table 4 and filtration heights ranged between 100 mm to 800 mm, as seen in Table 5. Materials were tested either as a stand-alone filtering material or disposed on top of different heights of filtration sand of 50 to 450 mm, as shown in Table 6. These experimental units were tested over a 5- to 12-month period for their pollutant's removal efficiency, using the biological oxygen demand after 5 days (BOD₅) and total suspended solids (TSS) as pollutant surrogates.

TABLE 3

Hydraulic load on biofilter blocs treatment performance

| Hydraulic load applied | $BOD_5$ removal (Median) | TSS removal (Median) |
|---|---|---|
| 0.10 m/d | 34% | 47% |
| 0.20 m/d | 47% | 57% |
| 0.30 m/d | 28% | 26% |
| 0.50 m/d | 28% | 23% |
| 0.75 m/d | 6% | 0% |

Stand-alone 200 mm high/90 kg/m$^3$ coco fibers blocs

TABLE 4

Biofilter blocs density on treatment performance

| Biofilter bloc density | $BOD_5$ removal (Median) | TSS removal (Median) |
|---|---|---|
| 35 kg/m$^3$ hemp fibers | 41% | 48% |
| 70 kg/m$^3$ hemp fibers | 65% | 70% |
| 40 kg/m$^3$ coco fibers | 27% | 19% |
| 80 kg/m$^3$ coco fibers | 27% | 33% |
| 90 kg/m$^3$ coco fibers | 47% | 57% |
| 100 kg/m$^3$ coco fibers | 48% | 70% |
| 145 kg/m$^3$ coco fibers | 61% | 72% |

Stand-alone 200 mm high blocs/Hydraulic load fixed at 0.2 m/d

TABLE 5

Biofilter blocs height on treatment performance

| Biofilter bloc height | $BOD_5$ removal (Median) | TSS removal (Median) |
|---|---|---|
| 100 mm | 35% | 29% |
| 200 mm | 47% | 57% |
| 500 mm | 70% | 63% |
| 800 mm | 86% | 76% |

Stand-alone 90 kg/m$^3$ coco fibers blocs/Hydraulic load fixed at 0.2 m/d

TABLE 6

Biofilter blocs treatment performance
when combined with a sand layer

| Sand layer height underneath the blocs | $BOD_5$ removal (Median) | TSS removal (Median) |
|---|---|---|
| 50 mm | 77% | 92% |
| 150 mm | 88% | 91% |
| 300 mm | 97% | 98% |
| 450 mm | 95% | 98% |

200 mm-high coco fibers blocs density 90 kg/m$^3$/Hydraulic load at 0.2 m/d

Graphs presenting results of the above parameters (hydraulic load, bloc density and bloc height) on $BOD_5$ removal performance are presented in FIG. 5, FIG. 6 and FIG. 7, and on TSS removal performance are presented in FIG. 8, FIG. 9, and FIG. 10.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

AFNOR, 2018. Norme FD U44-163. Amendements organiques et supports de culture—Caractérisation de la matière organique par la minéralisation potentielle du carbone et de l'azote AFNOR, 2016. Norme FD U44-162. Amendements organiques et supports de culture—Caractérisation de la matière organique par fractionnement biochimique et estimation de sa stabilité biologique. AFNOR, Paris.

Ghazy, M. R. et al. 2016. Performance of agricultural wastes as a biofilter media for low-cost wastewater treatment technology. Advances in Research, 7(6): 1-13.

Kennedy, P. 1998. Investigation of flow through peat filters. M.Sc. Thesis, Carleton University, Canada.

Lens, P. et al. 1994. Direct treatment of domestic wastewater by percolation over peat, bark and woodchips. Water Research, 28(1): 17-26.

Lashermes, G. et al. 2009. Indicator of potential residual carbon in soils after exogenous organic matter application. European Journal of Soil Science, 60:297-310.

Loh, Z. Z., et al. 2021. Shifting from Conventional to Organic Filter Media in Wastewater Biofiltration Treatment: A Review. Appl. Sci. 2021, 11, 8650. https://doi.org/10.3390/app1118865

Renang, W. A. et al. 2018. The effectiveness of a fabricated bio-filtration systeme in treating the domestic wastewater. Malaysian Applied Biology, 47(10): 65-71.

Rock, C. A. et al. 1984. Use of peat for on-site wastewater treatment: I Laboratory evaluation. Journal of Environmental Quality, 13:518-523.

Spychała, M. et al. 2021. A Preliminary Study on the Use of Xylit as Filter Material for Domestic Wastewater Treatment. Appl. Sci. 2021, 11, 5281. https://doi.org/10.3390/app11115281

Turcotte, V. 2009. Utilisation d'écailles de cacao comme matériau support pour la biofiltration d'effluents agroalimentaires. M.Sc. Thesis, Université du Québec, INRS-ETE, Canada.

The invention claimed is:

1. A biofilter block for wastewater treatment comprising a porous consolidated assembly of at least 20% w/w of organic material and a binder, wherein the consolidated assembly has a density of about 60 kg/m$^3$ to about 275 kg/m$^3$, and wherein the organic material comprises elongated fibers having an elongation ratio of width: length of about 1:2000 to about 1:750.

2. The biofilter block according to claim 1, wherein a surface area of the block is about 0.25 m$^2$ to about 8 m$^2$.

3. The biofilter block according to claim 2, wherein the surface area is about 0.5 m$^2$ to about 6 m$^2$.

4. The biofilter block according to claim 2, wherein the surface area is about 0.5 m$^2$ to about 6 m$^2$.

5. The biofilter block according to claim 1, wherein the density is about 60 kg/m$^3$ to about 200 kg/m$^3$.

6. The biofilter block according to claim 1, wherein the density is about 75 kg/m$^3$ to about 150 kg/m$^3$.

7. The biofilter block according to claim 1, wherein the consolidated assembly has a total porosity is about 70% to about 97% v/v.

8. The biofilter block according to claim 1, wherein the consolidated assembly has a total porosity is about 80% to about 95% v/v.

9. The biofilter block according to claim 1, wherein the consolidated assembly has a total porosity is about 85% to about 90% v/v.

10. The biofilter block according to claim 1, wherein said organic material has an index of exogenous organic carbon (EOC) of about 36 to about 95.

11. The biofilter block according to claim 1, wherein said organic material has an index of exogenous organic carbon (EOC) of about 50 to about 75.

12. The biofilter block according to claim 1, wherein the consolidated assembly comprises about 25% w/w to about 100% of organic material.

13. The biofilter block according to claim 1, wherein the consolidated assembly comprises about 40% w/w to about 80% w/w of organic material.

14. The biofilter block according to claim 1, wherein the organic material is a plant-origin material.

15. The biofilter block according to claim 1, wherein the organic material is selected from coconut fibers, hemp fibers, woodchips, wood fibers, flax fibers, rice residue, straw, peat, and mixtures thereof.

16. The biofilter block according to claim 1, wherein the binder is selected from latex, polylactic acid, polyester, polyurethane, and mixtures thereof.

17. The biofilter block according to claim 16, wherein the binder is latex.

18. The biofilter block according to claim 1, further comprising a protective shell surrounding all faces or leaving one face unprotected.

19. The biofilter block according to claim 1, wherein the consolidated assembly has a total porosity is about 92% to about 96% v/v.

\* \* \* \* \*